United States Patent
Jamjoom et al.

(10) Patent No.: US 9,256,463 B2
(45) Date of Patent: Feb. 9, 2016

(54) METHOD AND APPARATUS TO REPLICATE STATEFUL VIRTUAL MACHINES BETWEEN CLOUDS

(75) Inventors: Hani Jamjoom, Hawthorne, NY (US); Daniel J. Williams, Hawthorne, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 488 days.

(21) Appl. No.: 13/537,348

(22) Filed: Jun. 29, 2012

(65) Prior Publication Data
US 2014/0007088 A1    Jan. 2, 2014

(51) Int. Cl.
G06F 9/455    (2006.01)
H04L 29/08    (2006.01)
G06F 9/50    (2006.01)
G06F 9/48    (2006.01)

(52) U.S. Cl.
CPC .............. *G06F 9/4868* (2013.01); *G06F 9/455* (2013.01); *G06F 9/5077* (2013.01); *G06F 9/5088* (2013.01); *H04L 67/1002* (2013.01)

(58) Field of Classification Search
None
See application file for complete search history.

(56) References Cited

U.S. PATENT DOCUMENTS

| | | | |
|---|---|---|---|
| 7,613,749 B2 | 11/2009 | Flynn, Jr. et al. | |
| 7,739,349 B2 | 6/2010 | Holt | |
| 8,396,986 B2 * | 3/2013 | Kanada et al. | 709/238 |
| 8,819,678 B2 * | 8/2014 | Tsirkin | 718/1 |
| 2006/0143517 A1 | 6/2006 | Douceur et al. | |
| 2007/0169121 A1 * | 7/2007 | Hunt et al. | 718/1 |
| 2009/0113109 A1 * | 4/2009 | Nelson et al. | 711/6 |
| 2010/0107162 A1 * | 4/2010 | Edwards et al. | 718/1 |
| 2010/0174811 A1 | 7/2010 | Musiri et al. | |
| 2011/0007746 A1 * | 1/2011 | Mudigonda et al. | 370/395.21 |
| 2011/0167298 A1 | 7/2011 | Lee | |
| 2011/0208908 A1 | 8/2011 | Chou et al. | |
| 2012/0017031 A1 * | 1/2012 | Mashtizadeh et al. | 711/6 |
| 2012/0084445 A1 * | 4/2012 | Brock et al. | 709/226 |
| 2012/0096459 A1 * | 4/2012 | Miyazaki | 718/1 |
| 2012/0137287 A1 * | 5/2012 | Pang et al. | 718/1 |
| 2013/0086236 A1 * | 4/2013 | Baucke et al. | 709/223 |

OTHER PUBLICATIONS

Cully, et al., "Remus: High Availability via Asynchronous Virtual Machine Replication", NSDI' 08: 5th UNSENIX Symposium on Networked Systems Design and Implementation, pp. 161-174.

* cited by examiner

*Primary Examiner* — Qing Wu
*Assistant Examiner* — Wynuel Aquino
(74) *Attorney, Agent, or Firm* — F. Chau & Associates, LLC

(57) ABSTRACT

A method including replicating a first virtual machine (VM) in a first cloud and putting the replicated VM in a second cloud. Activating the first VM and pausing the replicated VM. First processing, at the first VM, traffic from VMs in the first cloud, wherein the first processing occurs when the first VM is activated and the replicated VM is paused. Buffering, at a hypervisor of the replicated VM, traffic from VMs in the second cloud, wherein the buffering occurs when the first VM is activated and the replicated VM is paused. Activating the replicated VM in response to state information of the first VM and pausing the first VM. Second processing, at the replicated VM, the buffered traffic according to the state information of the first VM, wherein the second processing occurs when the replicated VM is activated and the first VM is paused.

15 Claims, 7 Drawing Sheets

METHOD AND APPARATUS TO REPLICATE STATEFUL VIRTUAL MACHINES BETWEEN CLOUDS

BACKGROUND

1. Technical Field

The present invention relates to cloud based virtual networks, and more particularly, to a virtual machine replication scheme applicable to such networks.

2. Discussion of the Related Art

As enterprise workloads are migrated to the cloud, it is essential that hybrid and/or multi-cloud deployments are supported. However, enterprise workloads often contain servers or network components that act as choke points that may be tied to a single site and difficult to replicate. For example, many servers may communicate with a stateful firewall, dynamic host configuration protocol (DHCP) server, authentication server or file server. Servers on different clouds cannot communicate with these components locally, thereby causing significant traffic overhead between clouds or requiring the redesign of the application or component. FIGS. 1-3 exemplarily illustrate this scenario.

For example, FIG. 1 shows an enterprise workload built from a virtual network that includes virtual machines VM1-VM4 and a middlebox MB in a cloud computing environment 110. The middlebox MB may be a virtual machine that performs packet inspection, protocol acceleration, DHCP, authentication, etc. of traffic flowing between VM1-VM4, for example. The dashed lines between the virtual machines VM1 and VM2 and the middlebox MB illustrate traffic flowing from VM1 to VM2 and vice versa. The dashed lines between the virtual machines VM3 and VM4 and the middlebox MB illustrate traffic flowing from VM3 to VM4 and vice versa. FIG. 2 shows that even when the virtual machines VM3 and VM4 are moved to cloud computing environment 120, their traffic must still go through the middlebox MB in the cloud computing environment 110. FIG. 3 shows that the movement of the middlebox MB to the cloud computing environment 120 does not help much as traffic flow between VM1 and VM2 in the cloud computing environment 110 must still pass through the middlebox MB.

As can be seen, the placement of the middlebox MB in the cloud computing environment 110 or 120 can lead to a drop in performance of the virtual network. For example, in the case shown in FIG. 3, the traffic must leave the cloud computing environment 110 to be processed by the middlebox MB in the cloud computing environment 120. This transit takes time and affects latency. This transit also increases cost, since traffic leaving a cloud costs additional monies.

BRIEF SUMMARY

The present invention discloses a virtual machine replication scheme that improves performance of cloud based virtual networks.

In an exemplary embodiment of the present invention, the method includes: replicating a first virtual machine (VM) found in a first cloud computing environment and putting the replicated VM in a second cloud computing environment; activating the first VM and pausing the replicated VM; first processing, at the first VM, traffic from VMs in the first cloud computing environment, wherein the first processing occurs when the first VM is activated and the replicated VM is paused; first buffering, at a hypervisor corresponding to the replicated VM, traffic from VMs in the second cloud computing environment, wherein the first buffering occurs when the first VM is activated and the replicated VM is paused; activating the replicated VM in response to state information of the first VM and pausing the first VM; and second processing, at the replicated VM, the first buffered traffic according to the state information of the first VM, wherein the second processing occurs when the replicated VM is activated and the first VM is paused.

In an exemplary embodiment of the present invention, the method includes replicating a first VM to produce a second VM; activating the first VM and pausing the second VM; first processing traffic at the first VM, wherein the first processing occurs when the first VM is activated and the second VM is paused; buffering, at a virtual machine manager of the second VM, traffic destined for the second VM, wherein the first buffering occurs when the first VM is activated and the second VM is paused; activating the second VM in response to state information of the first VM and pausing the first VM; and second processing, at the second VM, the buffered traffic according to the state information of the first VM, wherein the second processing occurs when the second VM is activated and the first VM is paused.

In an exemplary embodiment of the present invention, the method includes replicating a first VM to produce a second VM and a third VM; activating the first VM and pausing the second VM and the third VM; first processing traffic at the first VM, wherein the first processing occurs when the first VM is activated and the second and third VMs are paused; first buffering, at a virtual machine manager of the second VM, traffic destined for the second VM, wherein the first buffering occurs when the first VM is activated and the second and third VMs are paused; second buffering, at a virtual machine manager of the third VM, traffic destined for the third VM, wherein the second buffering occurs when the first VM is activated and the second and third VMs are paused; activating the second VM in response to state information of the first VM and pausing the first VM; and second processing, at the second VM, the first buffered traffic according to the state information of the first VM, wherein the second processing occurs when the second VM is activated and the first and third VMs are paused.

DETAILED DESCRIPTION

Figure 1:
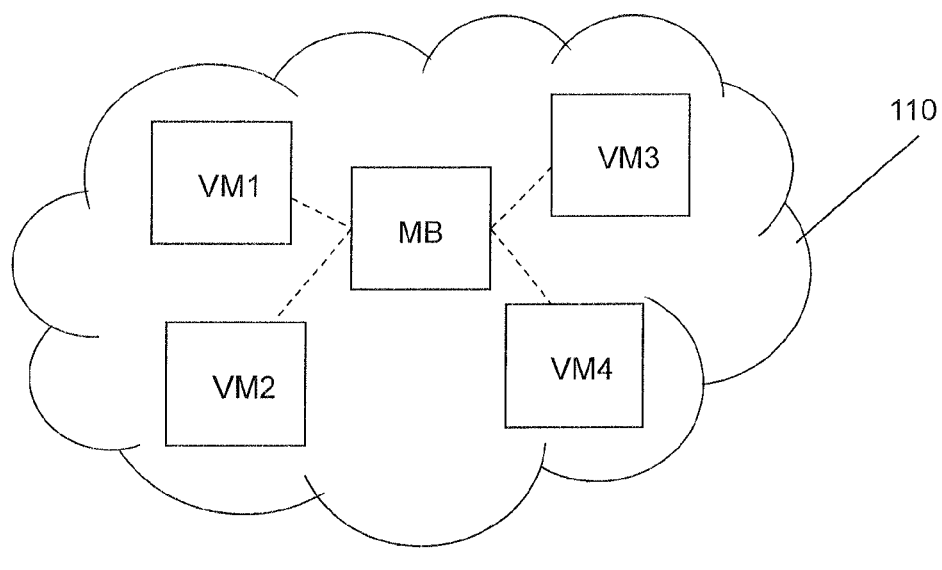
FIG. 1 illustrates a prior art virtual network configuration in a single cloud.
Figure 1:
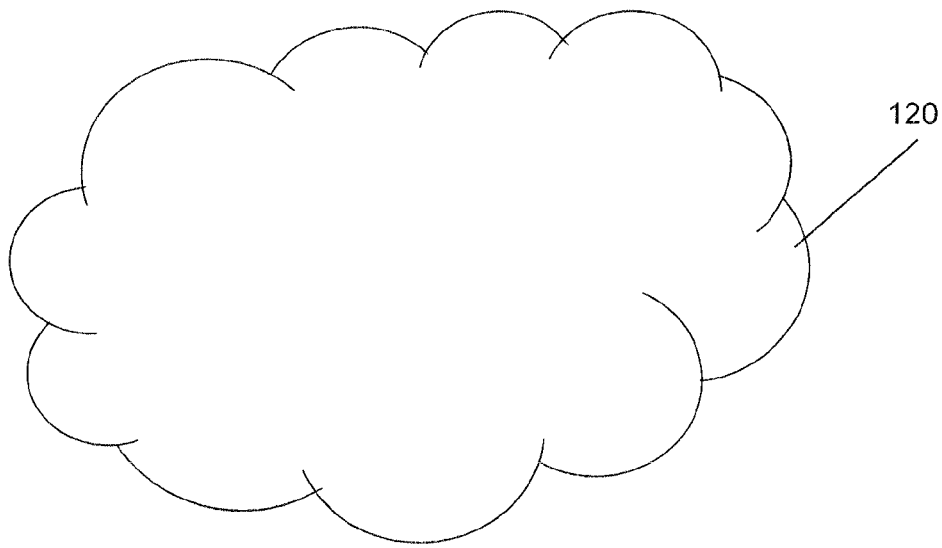
Figure 2:
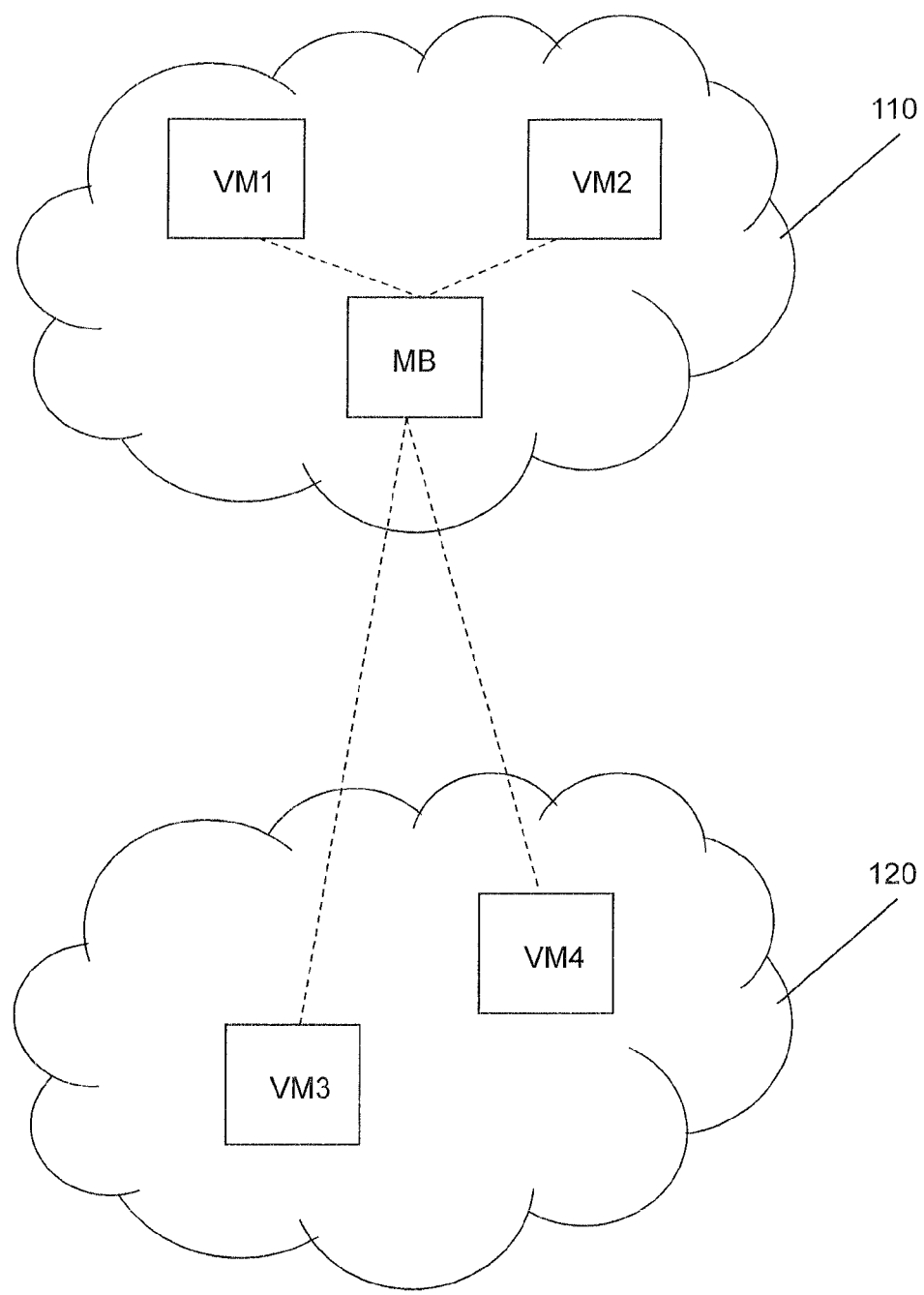
FIG. 2 illustrates a prior art virtual network configuration across clouds.
Figure 3:
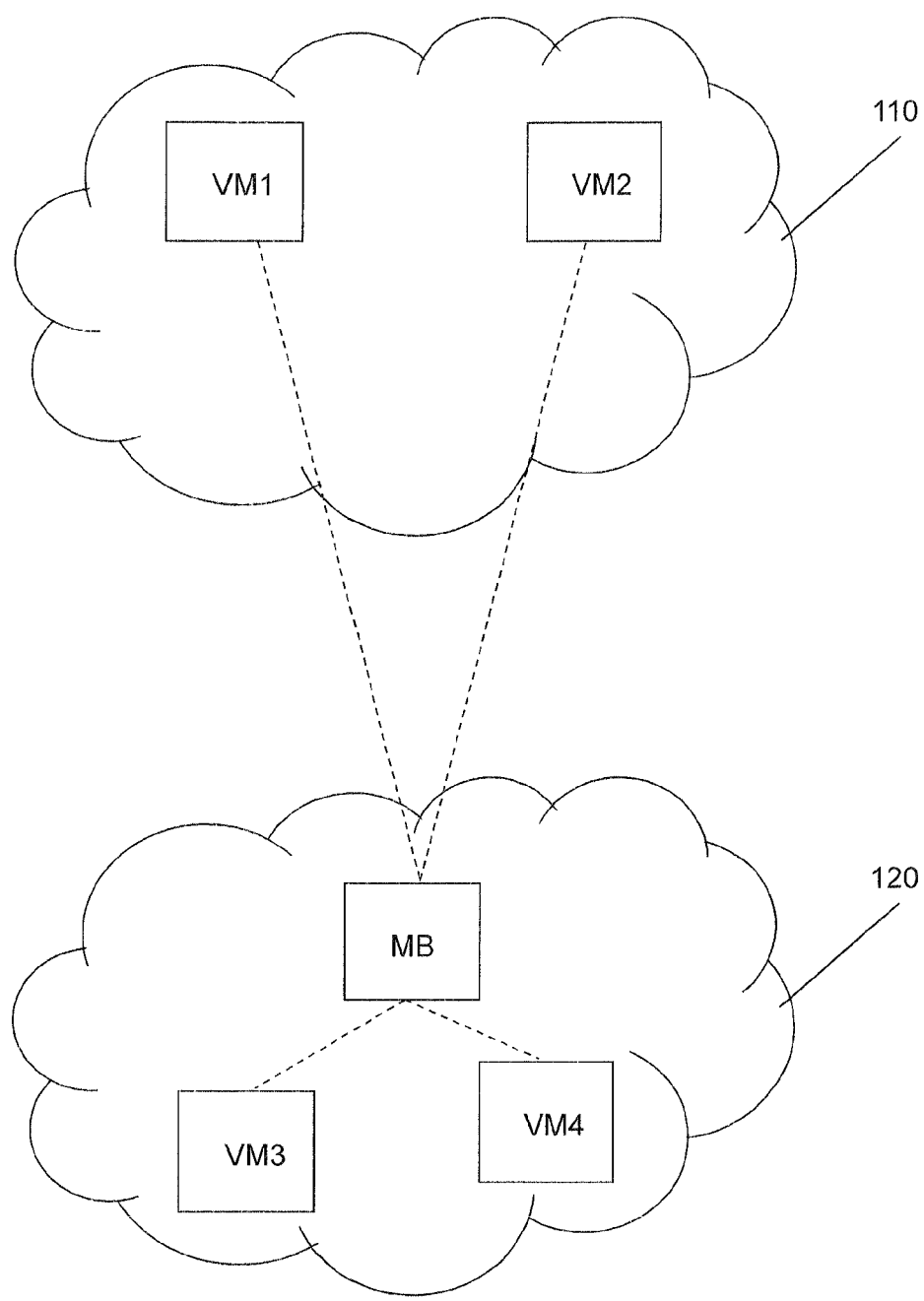
FIG. 3 illustrates a prior art virtual network configuration across clouds.

A cloud or a cloud computing environment may refer to the delivery of computing as a service rather than a product, whereby shared resources, software, and information are provided to computers and other devices as a metered service over a network (typically the internet).

A virtual machine (VM) may be a software implementation of a machine (e.g., a computer) that executes programs like a physical machine. VMs may be separated into two major categories, based on their use and degree of correspondence to any real machine. A system VM provides a complete system platform which supports the execution of a complete operating system (OS), for example. In contrast, a process VM is designed to run a single program, which means that it supports a single process, for example. An essential characteristic of a VM is that the software running inside is limited to the resources and abstractions provided by the VM, thus it cannot break out of its virtual environment.

As stateful VM may mean the VM keeps track of the state of an interaction, usually by setting values in a storage field designated for that purpose.

An enterprise workload may consist of a number of VMs that communicate with each other to form a network topology. Each VM may contain an application component or a middlebox that may be shared by multiple applications. An example enterprise workload may consist of two "three-tier" applications (a three-tier application includes a web server, an application server and a database, for example) in which all traffic from either Web tier must flow through a shared middlebox VM acting as a firewall or an intrusion detection system.

In brief, the present invention discloses a method and apparatus to replicate stateful VMs between multiple clouds, even if the VMs were not designed to be easily replicated. Replica VMs may be identical, down to the memory contents, internet protocol (IP) address and network connections that they contain. However, unlike standard replication schemes, according to the present invention, traffic can enter either of the VM replicas: there is no concept of master and slave. Additionally, only one of the VM replicas may be running at any one time. In other words, the replicas are time multiplexed. For example, before a replica begins to run, the two replicas become synchronized via a snapshot update of the VM memory state from the other replica, thus ensuring that the internal state of the VM (or replica) is always consistent.

Traffic at each site (e.g., cloud) is destined for its local replica. If the replica is currently running, the traffic proceeds into the VM for processing. Otherwise, the traffic is buffered until the replica becomes active.

This present inventive approach requires no knowledge of the internal workings of the VM; it operates at the hypervisor level. Furthermore, the potential diversion of every network packet to a different cloud is avoided: resulting in reduced cost both monetarily (clouds charge a fee for data coming in and going out of the cloud) and in terms of latency.

Figure 4:
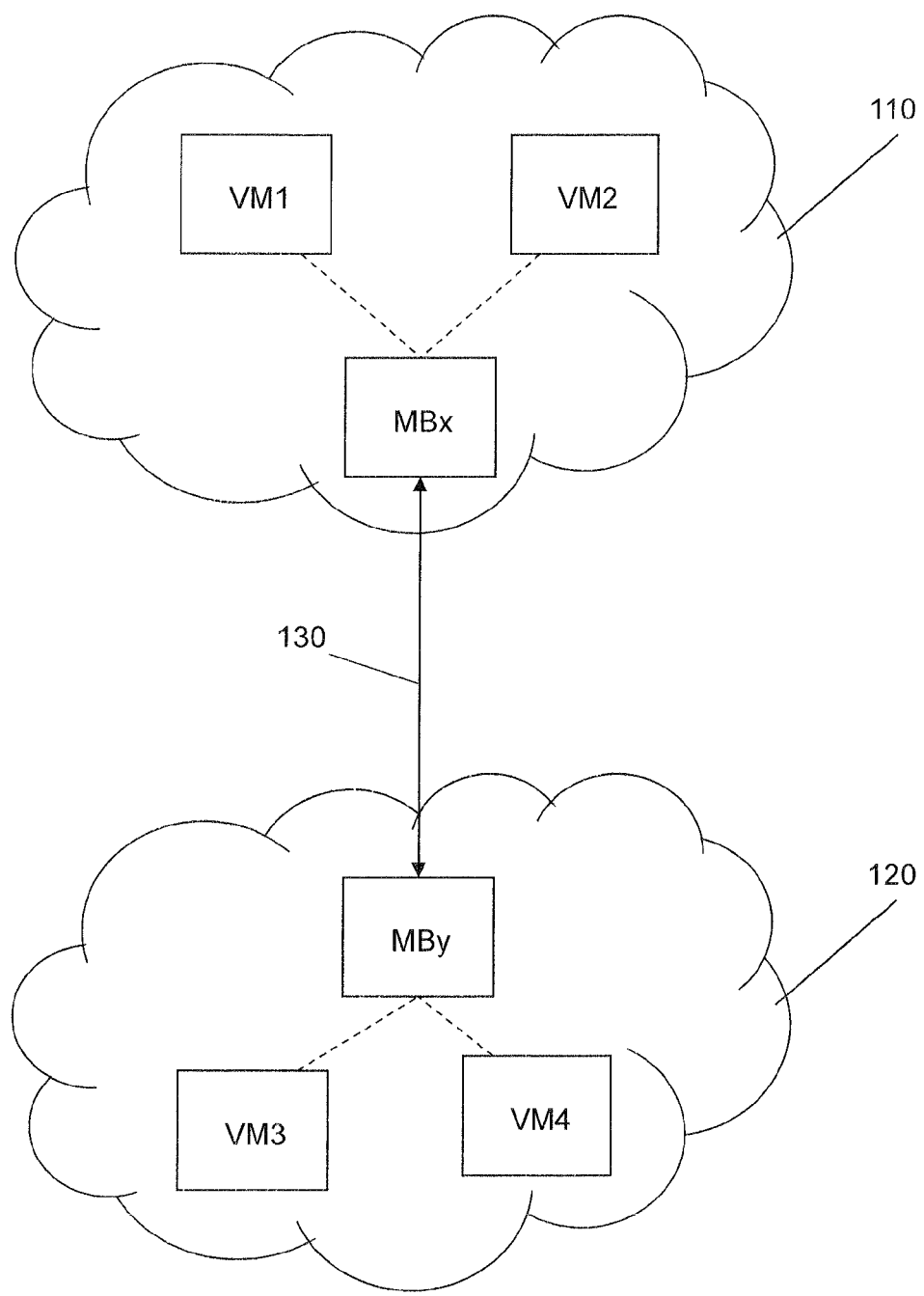
FIG. 4 illustrates a virtual network configuration across clouds, according to an exemplary embodiment of the present invention.

FIG. 4 illustrates a virtual network configuration across clouds, according to an exemplary embodiment of the present invention. In FIG. 4, middlebox MBy is a replica of middlebox MBx. A VM may be replicated by temporarily suspending the VM and copying all virtual memory, virtual central processing unit (CPU), and virtual device state to another physical machine, after which either the VM or its replica can be resumed. As shown in FIG. 4, traffic within the cloud computing environment 110 proceeds through the middlebox MBx and traffic within the cloud computing environment 120 proceeds through the middlebox MBy.

In an exemplary embodiment of the present invention, when the middlebox MBx is active, traffic from VM1 and VM2 in the cloud computing environment 110 is processed. While the middlebox MBx is active, the middlebox MBy is paused. While the middlebox MBy is paused, traffic from VM3 and VM4 in the cloud computing environment 120 is buffered at the hypervisor (or virtual machine manager (VMM)) of the middlebox MBy. These processes will now be described in detail with reference to FIGS. 5 and 6, with reference back to FIG. 4.

Figure 5:
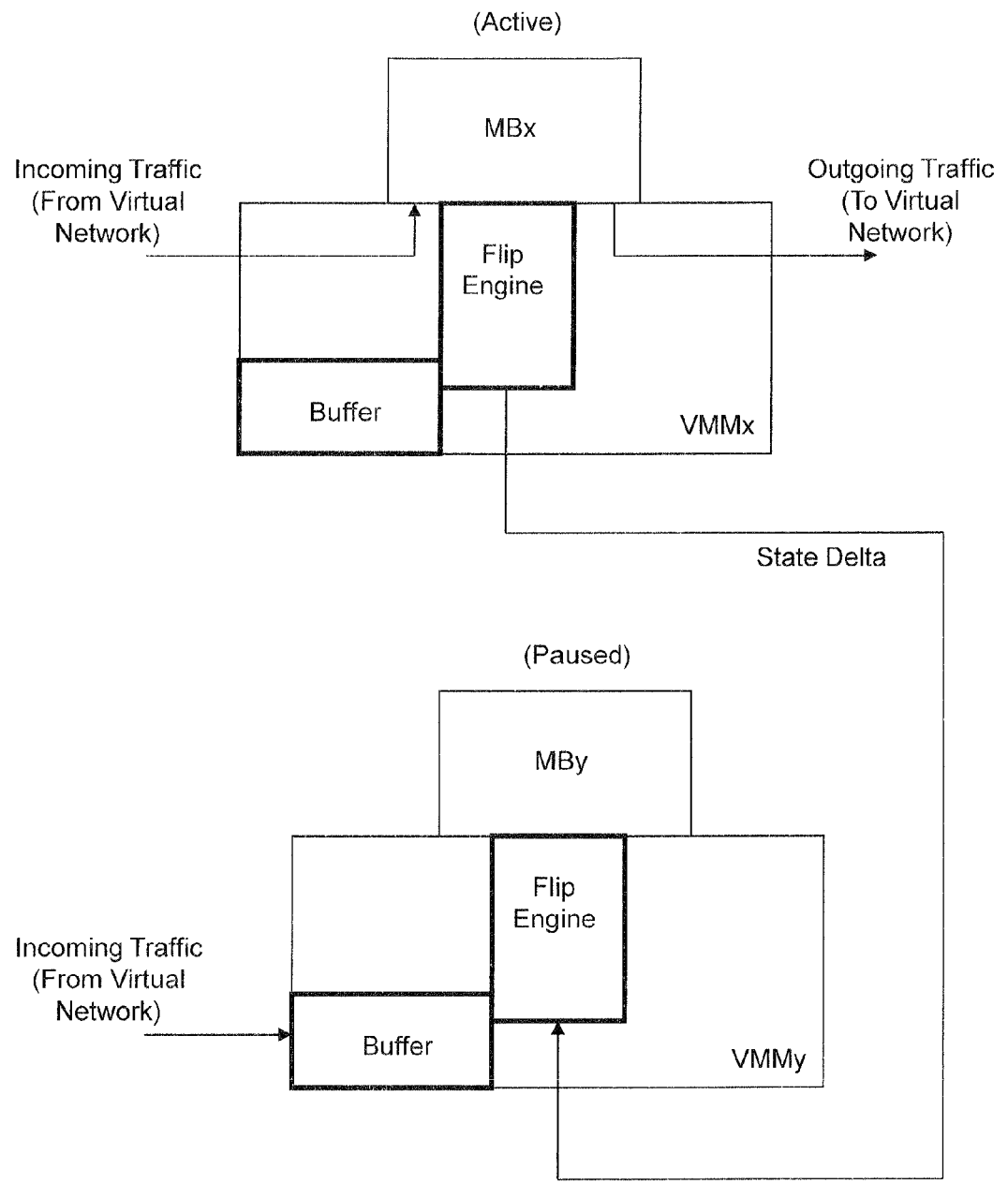
FIGS. 5 and 6 illustrate the operation and configuration of a virtual machine (VM), its virtual machine manager (VMM), a replica of the VM and the replica's VMM, according to an exemplary embodiment of the present invention.

In FIG. 5, there is shown the middlebox MBx in the active state and the middlebox MBy in the paused state. The middlebox MBx has its own hypervisor VMMx and the middlebox MBy has its own hypervisor VMMy. The hypervisor VMMx includes a buffer and a flip engine. The hypervisor VMMy includes a buffer and a flip engine. Since the middleboxes MBx and MBy are replicas, the buffers are the same as each other and the flip engines are the same as each other. In other words, architecturally, the buffers and the flip engines are the same. However, each buffer will be holding different network packets destined for MBx or MBy, respectively.

The buffer may be a reserved portion of memory on a physical machine which temporarily stores incoming network traffic while a replica is inactive. The flip engine may be a small program that determines when an active replica should become inactive and selects a target replica that should become active, based on the state of the buffer and/or input from other programs or users. A user may do this via an interface. The flip engine may also be responsible for transferring the state that was updated since the local active replica started to run the target replica.

When the middlebox MBx is active, as shown in FIG. 5, the middlebox MBx processes incoming traffic. For example, the middlebox MBx may process traffic from VM1 and VM2 in the cloud computing environment 110 of FIG. 4. However, the middlebox MBx may process traffic from VMs in another cloud. The actions performed by the middlebox MBx depend on the type of middlebox. For example, a firewall middlebox may examine headers on received packets, compare them against firewall rules and drop the packets if they violate any rules. In general, a middlebox may examine traffic and/or modify it as packets are processed.

After being processed by the middlebox MBx, the outgoing traffic is provided to the VMs in the cloud computing environment 110. However, the outgoing traffic may be provided to VMs in another cloud. While the middlebox MBx is active, the paused middlebox MBy may buffer incoming traffic. In this case, traffic from VM3 and VM4 in the cloud computing environment 120 may be kept in the buffer of hypervisor VMMy. The middlebox MBy also process traffic from VMs in another cloud.

While the middlebox MBx is active and processing incoming traffic, the modified state of the middlebox MBx is maintained in the flip engine of the middlebox MBx. Variables in the memory of the middlebox MBx may be updated; for example, a counter may be incremented or a firewall rule may be updated. In addition, the virtual CPU state, identifying which instruction the middlebox MBx is currently executing will continuously update. Depending on a particular circumstance, for example, when the number of packets received at the middlebox MBx reaches a predetermined threshold, when the number of packets stored in the buffer of the hypervisor VMMy reaches a predetermined threshold, or to achieve a target latency (e.g., by avoiding long packet wait times in the buffer), the flip engine sends a state delta signal (also shown as 130 in FIG. 4) to the paused middlebox MBy.

The state delta includes virtual memory and virtual CPU states that have been updated since the middlebox MBx became active. To track the modified virtual memory state, shadow memory techniques can be applied, as used for example in Cully et al., "Remus: High Availability via Asynchronous Virtual Machine Replication," NSDI 2008, pp. 161-174, the disclosure of which is incorporated by reference herein in its entirety. The state delta also includes the virtual CPU state maintained by the VMMx corresponding to the middlebox MBx.

Figure 6:
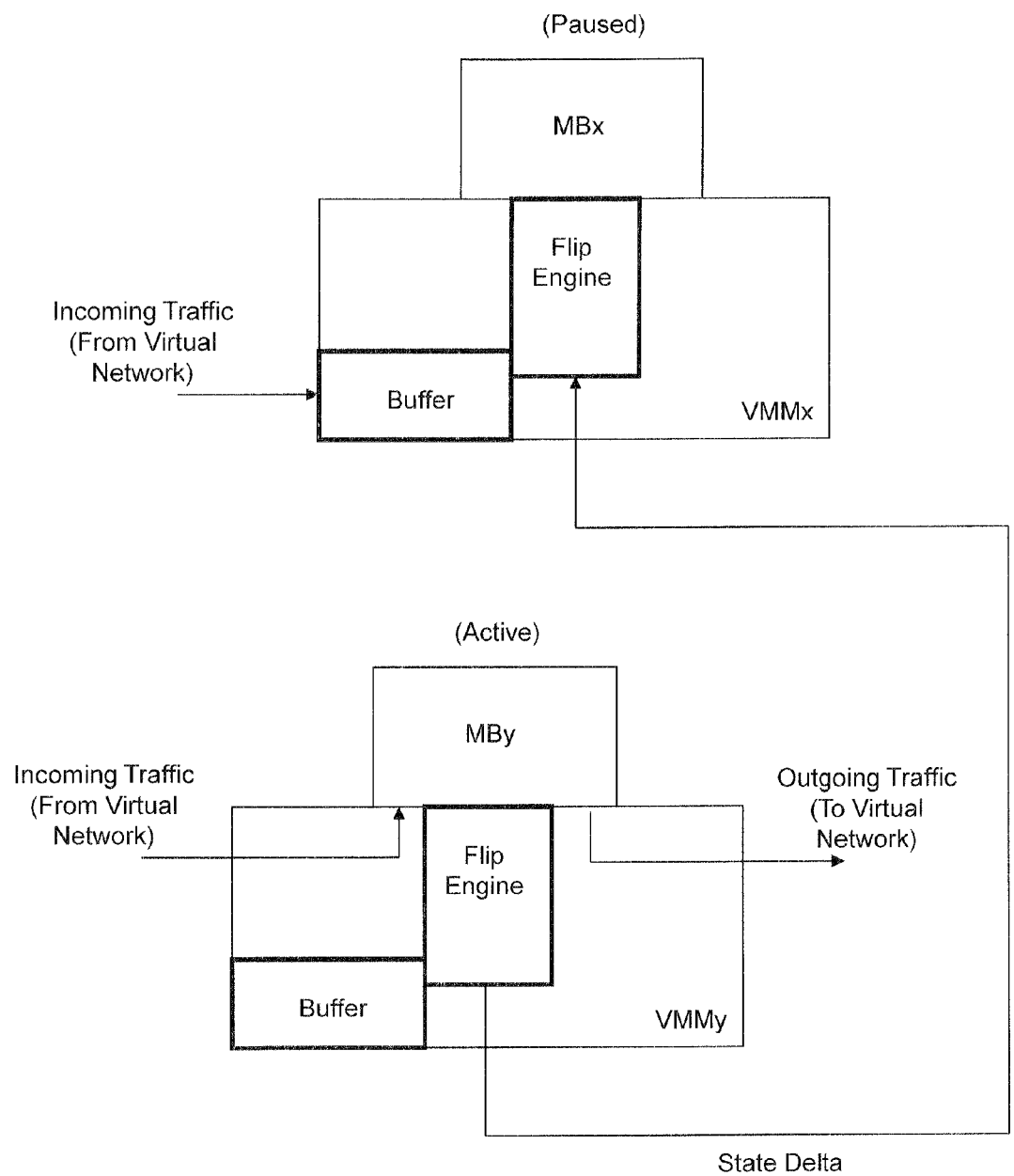

In response to the state delta, the middlebox MBy is activated as shown in FIG. 6. The middlebox MBx is paused at this time. Because the middlebox MBy received the state delta, which includes the last state of the middlebox MBx, the now active middlebox MBy is able to process the traffic stored in its buffer at that state. Based on the state delta, the memory pages modified by the middlebox MBx overwrite the state memory pages in the middlebox MBy before the middlebox MBy becomes active. Similarly, the virtual CPU context that the middlebox MBx was running is copied to the middlebox MBy. In other words, the middlebox MBy operates in synch with the middlebox MBy.

After the middlebox MBy finishes processing the packets stored in its buffer, the middlebox MBy processes incoming traffic. Since the middlebox MBx is paused, traffic destined for the middlebox MBx is stored in the buffer of the hypervisor VMMx. Similar to that described above, once the determination is made to reactivate the middlebox MBx, the flip engine of the hypervisor VMMy will send the state delta to the flip engine of the middlebox MBx and the middlebox MBx will first process the data stored in its buffer, and then, any new incoming packets. The middlebox MBy will be paused and operate like a paused VM as described above.

Although not shown, the present invention may be applicable to more than two replicated VMs. In this case, a set of scheduling policies may be used to trigger flips. For example, using a load balancing technique, the flip engine of an active VM may send a state delta to an inactive VM based on a comparison of the amount of data in each of the buffers of the inactive VMs. Thus, the VM with the most packets gets to run next.

In addition, the present invention provides a methodology to collapse the replicas back into a single instance. If, for any reason, multiple replicas are no longer necessary (e.g., all VMs are migrated to the same cloud), a VM one of the replicas can be selected to be destroyed. When the dying replica finishes its last period of activity, its buffer is marked as inactive and all packets from the virtual network that would have been received by the replica's buffer are diverted to a still living replica. All flip engines are notified of the departure of a replica so that it will not be scheduled again. Then, the VMM can reclaim the resources associated with the replica. This process can be repeated for all replicas until a single VM remains.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article or manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
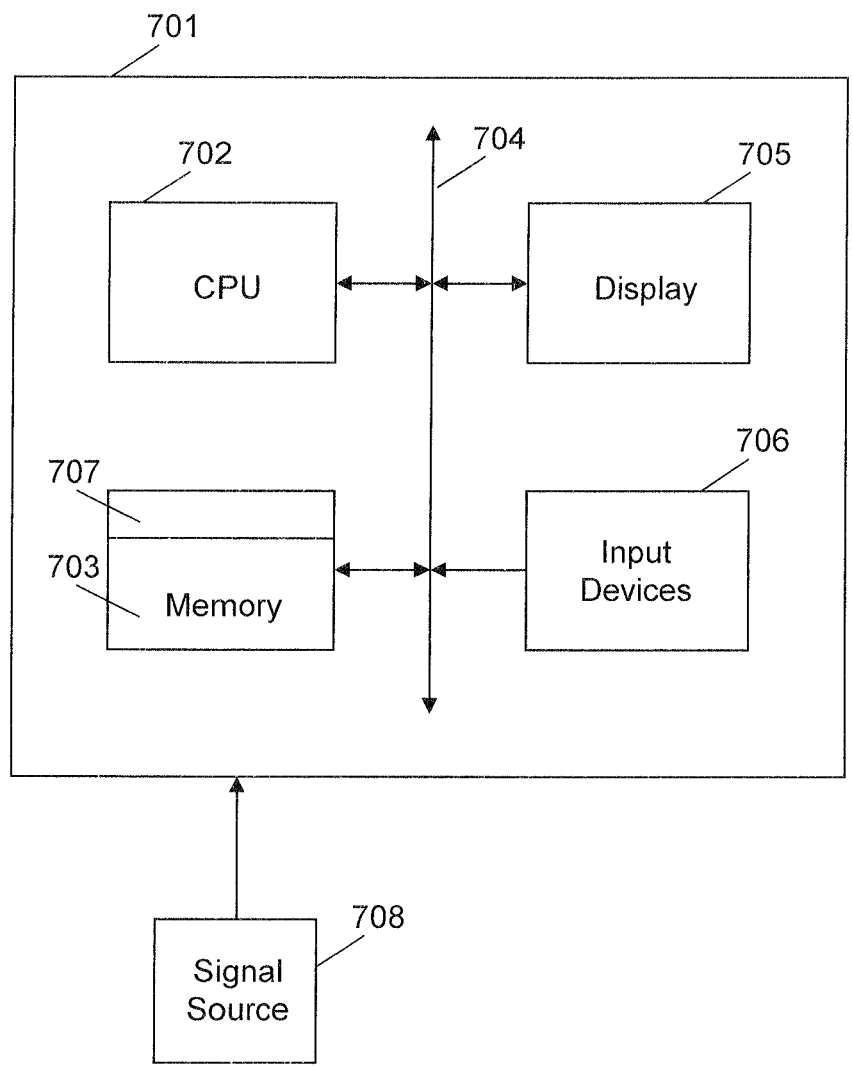
FIG. 7 illustrates an apparatus for implementing an exemplary embodiment of the present invention.

Referring now to FIG. 7, according to an exemplary embodiment of the present invention, a computer system 701 can comprise, inter alia, a CPU 702, a memory 703 and an input/output (I/O) interface 704. The computer system 701 is generally coupled through the I/O interface 704 to a display 705 and various input devices 706 such as a mouse and keyboard. The support circuits can include circuits such as cache, power supplies, clock circuits, and a communications bus. The memory 703 can include RAM, ROM, disk drive, tape drive, etc., or a combination thereof. Exemplary embodiments of present invention may be implemented as a routine 707 stored in memory 703 (e.g., a non-transitory computer-readable storage medium) and executed by the CPU 702 to process the signal from the signal source 708. As such, the computer system 701 is a general-purpose computer system that becomes a specific purpose computer system when executing the routine 707 of the present invention.

The computer platform 701 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical functions(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
replicating a first virtual machine (VM) found in a first cloud computing environment and putting the replicated VM in a second cloud computing environment;
wherein the first cloud computing environment comprises:
a first hypervisor coupled to the first VM;
a first flip engine included with the first hypervisor; and
a first buffer included with the first hypervisor for buffering traffic of VMs within the first cloud computing environment destined for the first VM;
wherein the second cloud computing environment comprises:
a second hypervisor coupled to the replicated VM;
a second flip engine included with the second hypervisor; and
a second buffer included with the second hypervisor for buffering traffic of VMs within the second cloud computing environment destined for the replicated VM;
activating the first VM and pausing the replicated VM;
first processing, at the first VM, traffic from the VMs in the first cloud computing environment, wherein the first processing occurs when the first VM is activated and the replicated VM is paused;
buffering, at the second buffer of the second hypervisor corresponding to the replicated VM, traffic destined for the replicated VM from the VMs in the second cloud computing environment, wherein the buffering occurs when the first VM is activated and the replicated VM is paused;
determining, with the first flip engine, state information for sending a state delta signal to the replicated VM for activation, wherein the state information represents a number of packets received at the first VM or a number of packets stored in the second buffer of the replicated VM;
automatically sending the state delta signal from the first flip engine to the second flip engine, wherein the state delta signal includes virtual memory and central processing unit states that have been updated since the first VM became active;
in response to the state delta signal, memory pages modified by the first VM overwrite state memory pages in the replicated VM before the replicated VM becomes active so that the replicated VM processes the buffered traffic in the second buffer at the last state of the first VM;
activating the replicated VM in response to overwriting state memory pages and pausing the first VM; and
second processing, at the replicated VM, the buffered traffic in the second buffer according to the state information of the first VM, wherein the second processing occurs when the replicated VM is activated and the first VM is paused.

2. The method of claim 1, wherein the replicated VM has the same state as the first VM in the second processing.

3. The method of claim 1, further comprising:
third processing, at the replicated VM, new traffic from the VMs in the second cloud computing environment, wherein the third processing occurs when the replicated VM is activated and the first VM is paused;
buffering, at the first buffer, new traffic from the VMs in the first cloud computing environment, wherein the buffering occurs when the first VM is paused and the replicated VM is active;
activating, for the second time, the first VM in response to state information of the replicated VM and pausing, for the second time, the replicated VM; and
fourth processing, at the first VM, the buffered traffic in the second buffer according to the state information of the replicated VM, wherein the fourth processing occurs when the first VM is activated, for the second time, and the replicated VM is paused, for the second time.

4. The method of claim 3, wherein the first VM has the same state as the replicated VM in the fourth processing.

5. The method of claim 1, further comprising:
deleting the replicated VM.

6. A method, comprising:
replicating a first virtual machine (VM) found in a first physical machine and putting the replicated VM in a second physical machine;
wherein the first physical machine comprises:
a first hypervisor coupled to the first VM;
a first flip engine included within the first hypervisor; and
a first buffer residing within the first hypervisor for buffering traffic of VMs within the first physical machine destined to the first VM;
wherein the second physical machine comprises:
a second hypervisor coupled to the replicated VM;
a second flip engine included within the second hypervisor; and
a second buffer residing within the second hypervisor for buffering traffic of VMs within the second physical machine destined to the replicated VM;
activating the first VM and pausing the replicated VM;
first processing, at the first VM, traffic from the VMs in the first physical machine, wherein the first processing occurs when the first VM is activated and the replicated VM is paused;
first buffering, at the second buffer, traffic destined to the replicated VM from the VMs in the second physical machine, wherein the first buffering occurs when the first VM is activated and the replicated VM is paused;
dynamically determining, by at least one of the flip engines, state information for sending a state delta signal to the replicated VM for activation wherein the state information represents a number of packets received at the first VM or a number of packets stored in the second buffer of the replicated VM;
automatically sending the state delta signal from the first flip engine to the second flip engine, wherein the state delta signal includes virtual memory and central processing unit states that have been updated since the first VM became active;
in response to the state delta signal, memory pages modified by the first VM overwrite state memory pages in the replicated VM before the replicated VM becomes active so that the replicated VM processes the buffered traffic in the second buffer at the last state of the first VM;
activating the replicated VM in response to overwriting state memory pages, and pausing the first VM; and
second processing, at the replicated VM, the buffered traffic in the second buffer according to the state information of the first VM, wherein the second processing occurs when the replicated VM is activated and the first VM is paused.

7. The method of claim 6, wherein the first VM is disposed in a first cloud computing environment and the traffic processed by the first VM is provided from VMs in the first computing environment or a different cloud computing environment.

8. The method of claim 6, wherein the first VM is disposed in a first cloud computing environment and the traffic processed by the first VM is provided to VMs in the first computing environment or a different cloud computing environment.

9. The method of claim 6, wherein the second VM is disposed in a first cloud computing environment and the buffered traffic in the second buffer is provided from VMs in the first computing environment or a different cloud computing environment.

10. The method of claim 6, wherein the buffered traffic in the second buffer is processed by the second VM in synch with the first VM.

11. A method, comprising:
replicating a first virtual machine (VM) found in a first physical machine to produce a first replicated VM and a second replicated VM;
putting the replicated VM in a second physical machine and the second replicated VM in a third physical machine;
wherein the first physical machine comprises:
a first hypervisor coupled to the first VM;
a first flip engine included within the first hypervisor; and
a first buffer residing within the first hypervisor for buffering traffic of VMs within the first physical machine destined to the first VM;
wherein the second physical machine comprises:
a second hypervisor coupled to the first replicated VM;
a second flip engine included within the second hypervisor; and
a second buffer residing within the second hypervisor for buffering traffic of VMs within the second physical machine destined to the first replicated VM;
wherein the third physical machine comprises:
a third hypervisor coupled to the second replicated VM;
a third flip engine included within the third hypervisor; and
a third buffer residing within the third hypervisor for buffering traffic of VMs within the third physical machine destined to the second replicated VM;
activating the first VM and pausing the first replicated VM and the second replicated VM;
first processing, at the first VM, traffic from the VMs in the first physical machine, wherein the first processing occurs when the first VM is activated and the first replicated VM and the second replicated VM are paused;
first buffering, at the second buffer of the second hypervisor corresponding to the first replicated VM and at the third buffer of the third hypervisor corresponding to the second replicated VM, traffic destined to the first replicated VM from the VMs in the second physical machine and traffic destined to the second replicated VM from the VMs in the third physical machine, wherein the first buffering occurs when the first VM is activated and the first replicated VM and the second replicated VM are paused;

dynamically determining, by at least one of the flip engines, state information for sending a state delta signal to the first replicated VM or the second replicated VM for activation;

wherein the state information represents a number of packets received at the first VM or a number of packets stored in the second buffer of the first replicated VM;

wherein the state delta signal sent to the first replicated VM is determined to have the greatest number of packets residing in the second buffer compared to the third buffer;

automatically sending the state delta signal from the first flip engine to the second flip engine, wherein the state delta signal includes virtual memory and central processing unit states that have been updated since the first VM became active;

in response to the state delta signal, memory pages modified by the first VM overwrite state memory pages in the first replicated VM before the first replicated VM became active so that the first replicated VM processes the first buffered traffic at the last state of the first VM;

activating the first replicated VM in response to overwriting state memory pages, and pausing the first VM; and second processing, at the first replicated VM, the first buffered traffic in the second buffer according to the state information of the first VM, wherein the second processing occurs when the first replicated VM is activated and the first VM is paused.

12. The method of claim 11, wherein the first replicated VM is activated according to a scheduling policy.

13. The method of claim 12, wherein the scheduling policy is set manually by a user or programmatically by a computer.

14. The method of claim 12, wherein the scheduling policy is based on a data load applied to the second and third buffers of the first and second replicated VMs.

15. The method of claim 12, further comprising:

pausing the first replicated VM, activating the second replicated VM and keeping the first VM paused according to the scheduling policy.

\* \* \* \* \*